(12) United States Patent
Elie-Dit-Cosaque et al.

(10) Patent No.: US 7,706,258 B2
(45) Date of Patent: Apr. 27, 2010

(54) SYSTEM AND METHOD FOR DETECTING LOOPS IN A CUSTOMER-PROVIDER BRIDGE DOMAIN

(75) Inventors: David Elie-Dit-Cosaque, Richardson, TX (US); Kamakshi Sridhar, Plano, TX (US)

(73) Assignee: Alcatel Lucent, Paris (FR)

( * ) Notice: Subject to any disclaimer, the term of this patent is extended or adjusted under 35 U.S.C. 154(b) by 1084 days.

(21) Appl. No.: 11/022,196

(22) Filed: Dec. 22, 2004

(65) Prior Publication Data

US 2006/0133286 A1 Jun. 22, 2006

(51) Int. Cl.
*H04J 1/16* (2006.01)
(52) U.S. Cl. .................... 370/224; 370/222; 370/236.2; 370/249
(58) Field of Classification Search .................. 370/249, 370/224, 256, 221, 389, 216, 229, 235, 236.2, 370/241.1, 222, 241
See application file for complete search history.

(56) References Cited

U.S. PATENT DOCUMENTS

| | | | | |
|---|---|---|---|---|
| 5,636,260 | A * | 6/1997 | Chopping | 379/22.01 |
| 6,023,455 | A * | 2/2000 | Takahashi | 370/249 |
| 2003/0037162 | A1 | 2/2003 | Kotser | |
| 2004/0165595 | A1* | 8/2004 | Holmgren et al. | 370/395.3 |
| 2005/0099949 | A1* | 5/2005 | Mohan et al. | 370/236.2 |

FOREIGN PATENT DOCUMENTS

WO WO 00/75962 A2 12/2000

OTHER PUBLICATIONS

Squire; "Metro Ethernet Forum OAM"; Metro Ethernet Forum; pp. 1-25.
"Making Universal Broadband Access A Reality"; Ethernet in the First Mile Alliance (EFMA); http://www.efmalliance.org/whitepaper.html; pp. 1-14.
"Bringing Carrier-Class Management to Ethernet in the First Mile"; Metrobility Optical Systems; pp. 1-8.
"Service delivery technologies for Metro Ethernet Networks"; Nortel Networks; pp. 1-10.
"Layer 2 Protocol Conformance Testing for Ethernet switches"; Net-O2 Technologies; pp. 1-16.
Finn; "Metro Ethernet Connection Management"; IEEE Interim meeting; Jan. 2004; pp. 1-77.
Iwamura; "OAM Flow of Ethernet OAM"; International Telecommunication Union; Feb. 2004; pp. 1-9.
Mohan; "Ethernet OAM Update Overview & Technical Aspects"; Nortel Networks; May 18, 2004; 17 pages.

(Continued)

*Primary Examiner*—Jason E Mattis
*Assistant Examiner*—Dady Chery
(74) *Attorney, Agent, or Firm*—Raymond M. Galasso; Galasso & Associates, L.P.

(57) ABSTRACT

A loop detection system and method operable in an Ethernet network having a provider network and a customer network. In one embodiment, a provider edge (PE) entity is operable to generate a test frame with at least one of a destination address (DA) and source address (SA) that is unknown to the customer network. The test frame is broadcast to the customer network coupled to the PE entity. Upon determining that the test frame or its duplicates are received back by the PE entity within a first time period, loop location within the Network is deduced responsive to the determination.

27 Claims, 6 Drawing Sheets

OTHER PUBLICATIONS

Ibanez, Guillermo, et al "Alternative Multiple Spanning Tree Protocol (AMSTP) for Optical Ethernet Backbones", Proceedings of the 29th Annual IEEE International Conference on Local Computer Networks (LCN'04), Computational Systems Bioinformatics Conference, 2004. pp. 744-751.

* cited by examiner

SYSTEM AND METHOD FOR DETECTING LOOPS IN A CUSTOMER-PROVIDER BRIDGE DOMAIN

BACKGROUND OF THE INVENTION

1. Technical Field of the Invention

The present invention generally relates to Ethernet networks. More particularly, and not by way of any limitation, the present invention is directed to a system and method for detecting loops in a customer-provider bridge domain of an Ethernet network.

2. Description of Related Art

The link between the end user and the public network, essential key to the delivery of broadband applications to residential and business subscribers, is known by many names, e.g., first mile, last mile, local loop, metro access, subscriber access network, etc., and is implemented using a variety of different transport technologies and protocols over diverse physical connections. For instance, today most users connect to the public network with Digital Subscriber Line (DSL), Integrated Services Digital Network (ISDN), cable TV, T1/E1 or T3/E3 lines, using Synchronous Optical Network and its companion Synchronous Digital Hierarchy (SONET/SDH), Frame Relay and Asynchronous Transfer Mode (ATM). Regardless of the nomenclature or the actual implementation, all access networks require operations, administration and maintenance (OAM) support features to ensure the maintainability and uptime required to provide broadband services.

Current first/last mile solutions have significant shortcomings from the customer's perspective, ranging from performance bottlenecks, fixed bandwidth provisioning, limited scalability, lack of flexibility and provisioning complexity to end-to-end quality of service (QoS) issues and a high cost structure. The use of robust, simple Ethernet technology in the first mile promises to revolutionize the access network as it did the enterprise network. Ethernet is a local area network (LAN) transport technology that is used ubiquitously in the home and in business to communicate between computers and networks. As an access technology, Ethernet offers three significant advantages over legacy first mile technologies: (i) future-proof transport for data, video and voice applications; (ii) cost-effective infrastructure for data services; and (iii) simple, globally accepted standard that will ensure interoperability.

As is well-known, various standards are being specified to enhance service delivery technologies, which allow provisioning of Virtual LANs (VLANs) on top of a Layer-2 (L2) Ethernet network for adding flexibility, scalability and security to the network. VLANs may be defined on different levels, e.g., customer-level or provider-level, and can include any number of non-intersecting domains. Service frame fields preceded with a "C-", e.g., C-VLAN ID, refers to customer-created fields. Likewise, service frame fields preceded with a "P-" (e.g., P-VLAN ID), refer to provider-added fields. By implementing VLANs, an end-to-end Ethernet network may be partitioned into a number of service instances while preserving multiple subscribers' C-VLANs, wherein the traffic in a given VLAN is invisible to end hosts belonging to a different VLAN, thus reducing the broadcast domain.

In order to help avoid data loops (which can cause inefficiency due to wasted bandwidth) and recover from failures in an Ethernet network that comprises various bridges in a meshed topology, protocols such as Spanning Tree Protocol (STP) or Rapid Spanning Tree Protocol (RSTP) have been available that allow for dynamic discovery of a topology by the bridges. Essentially, upon transmission of special Configuration Bridge Protocol Data Units (or Configuration BPDUs), a single Root bridge is elected from an Ethernet topology and a Root port is chosen on each bridge that gives the best path from each bridge to the Root. Also, select ports are chosen as Designated Ports for each individual VLAN, which forward frames from the direction of the Root onto a particular VLAN and frames from that VLAN towards the Root. The Root bridge periodically transmits Configuration BPDUs every "hello time," whereupon the other bridges receiving them transmit a configuration reply message on each of their ports for which they are designated. In case any bridge notices that the STP algorithm has caused it to transition a port into or out of blocking state, it generates a Topology Change Notification (TCN) message towards the Root bridge repeatedly, typically until an acknowledgment is received.

The enhanced functionality of RSTP provides rapid convergence of the spanning tree and allows for fast reconfiguration that is critical for networks carrying delay-sensitive traffic. Additionally, the Multiple Spanning Tree Protocol (MSTP) allows for the mapping of several VLANs to a single spanning-tree instance called MST-Instance (MSTI) wherein each instance is independent of other spanning-tree instances. In this approach, multiple forwarding paths may be provided for data traffic, enabling load balancing. Also, it reduces the number of spanning-tree instances required to support a large number of VLANs.

In the context of Ethernet implementations, e.g., a metro Ethernet, it is typical for a provider network to interconnect multiple customer VLANs. However, it is known that data loops can arise if an attached customer network does not correctly operate its own instance or instances of a spanning-tree, which may degrade the performance of the network to unacceptable levels.

SUMMARY OF THE INVENTION

In one aspect, the present invention is directed to a loop detection system and method operable in an Ethernet network having a provider network and a customer network. In one embodiment, a provider edge (PE) entity is operable to generate a test frame with at least one of a destination address (DA) or a source address (SA) that is unknown to the customer network. The test frame is broadcast to the customer network coupled to the PE entity. Upon determining that the test frame or its duplicates are received back by the PE entity within a first time period, loop location within the network is deduced responsive to the determination. In another embodiment, the loop detection scheme may comprise a logic structure associated with the PE entity for multicasting a provider information frame to other provider bridge entities of the provider network, wherein the provider information includes at least one of the test frame's SA and DA, and is transmitted prior to broadcasting the test frame. When a provider bridge receives the test frame or one or more of its duplicates, the provider bridge's ID (e.g., its MAC address or an STP-based ID) is inserted into a particular portion of the test frame's data payload field. Thereafter, the modified test frame or its duplicate is forwarded to the PE entity for deducing the location of loops in the Network.

BRIEF DESCRIPTION OF THE DRAWINGS

The accompanying drawings are incorporated into and form a part of the specification to illustrate one or more presently preferred exemplary embodiments of the present invention. Various advantages and features of the invention will be understood from the following Detailed Description taken in connection with the appended claims and with reference to the attached drawing figures in which:

DETAILED DESCRIPTION OF THE DRAWINGS

Figure 1:
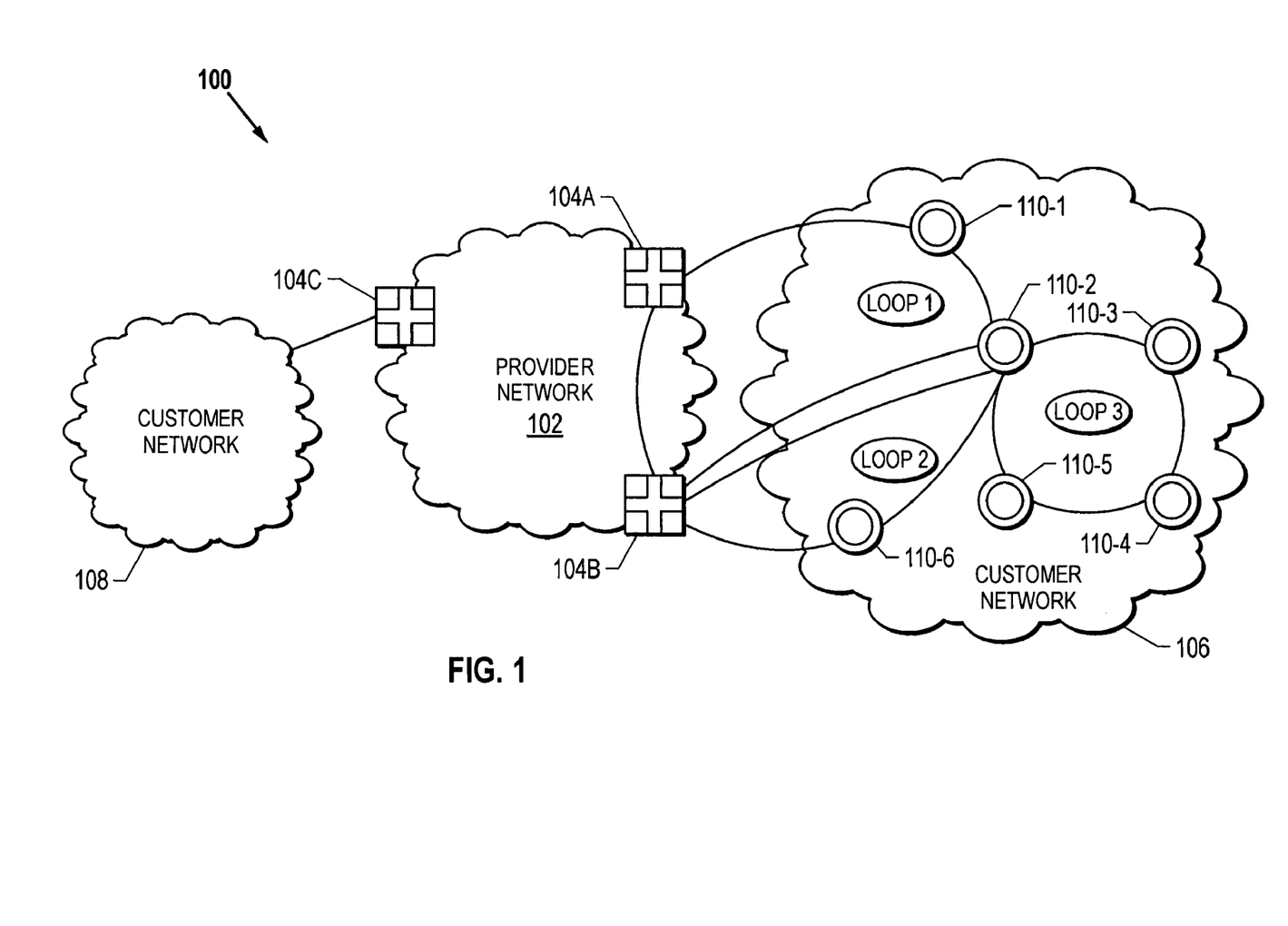
FIG. 1 depicts an exemplary provider-customer network configuration where one or more loops may arise.

Embodiments of the invention will now be described with reference to various examples of how the invention can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary provider-customer Network configuration 100 where one or more loops may arise. As illustrated, the network configuration 100 includes a provider network 102, with provider edge (PE) bridge entities 104A-104C being representatively disposed therein. One or more customer VLANs (C-VLANs) or portions thereof are coupled to the provider network via respective PE entities. For example, customer VLAN network 106 is coupled to the provider network via PE 104A and 104B, whereas customer VLAN network 108 is coupled to the provider network 102 via PE 104C. Those skilled in the art should recognize that the customer VLANs 106 and 108 may also represent, in one embodiment, separate portions of a single multi-site customer network.

Three possible loop scenarios are exemplified in the network configuration 100, wherein data loops may arise if an attached customer network or its portion(s) does not correctly operate its own instance or instances of the Spanning Tree Protocol. With respect to C-VLAN 106, which is illustrated with bridge equipment 110-1 through 110-6, three data loops are shown. Loop 1 is representative of a data loop via the provider network 102 and includes at least a loop segment that traverses the provider network. For example, Loop 1 comprises a path through PE 104A, customer bridges 110-1, 110-2, and PE 104B. Loop 2 is representative of a data loop that touches a PE entity, but is not in the provider domain. Accordingly, Loop 2 comprises a path through PE 104B and customer bridges 110-2, 110-6. Loop 3, which is representative of data loops that are disposed entirely in the customer domain network, comprises a path through customer bridges 110-2, 110-3, 110-4 and 110-5. As will be described in detail hereinbelow, the loop detection scheme of the present patent application is capable of detecting any of these types of data loops in an exemplary Ethernet network environment.

Figure 2:
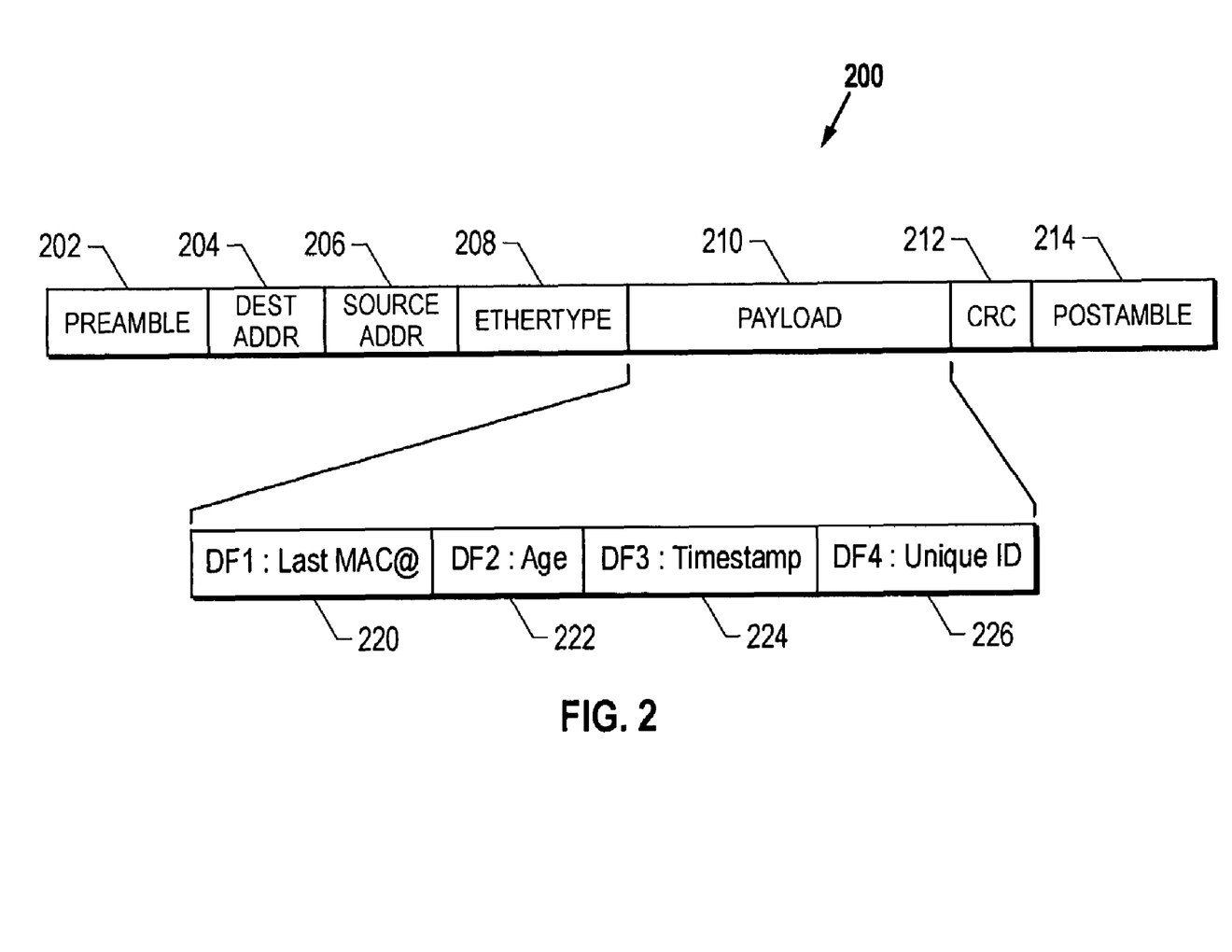
FIG. 2 depicts an exemplary test frame for detecting loops according to one embodiment of the invention.

FIG. 2 depicts an exemplary test frame 200 for detecting loops according to one embodiment of the invention. In order to test for loop detection and location, a PE entity is provided with appropriate logic structure operable to generate the test frame 200 with an unknown MAC address, i.e., either a DA or SA with the MAC address being unknown to the customer network with which the PE entity is interfaced. The DA/SA MAC address is not known to the customer network because the DA/SA MAC address information is not provisioned in the forwarding/filtering databases of the customer equipment (CE) nodes. Additionally, the test frame 200 is comprised of a frame having the format of a regular data frame, but with an encoded payload to facilitate loop detection. Accordingly, compliant with the regular data frame format, the test frame includes preamble and postamble fields 202 and 214, DA and SA fields 204 and 206, EtherType field 208 (e.g., IP), and a CRC field 212. In one embodiment, the encoded payload field 220 contains a plurality of sub-fields with the following information: DF1 220 containing the MAC address of the last provider bridge the test frame has traversed; DF2 222 containing the age limit of a unique MAC address provided as the test frame's DA or SA; DF3 224 that contains a timestamp; and DF4 226 containing a unique identifier (ID) in order to detect duplicates of the test frame. Each of the sub-fields may be encrypted in any known or heretofore unknown manner.

In one implementation, the unknown MAC address of the SA and/or DA fields may be randomly generated. In a further embodiment, the unknown MAC may be selected from a set of unique addresses reserved to a PE entity operable to generate loop detection test frames. Additionally, the unknown MAC address of the SA and/or DA fields may be provided as temporary addresses that may exist only for a limited time period, e.g., a few seconds if the network environment is loop-free or not congested. In a still further variation, a testing PE may insert some random data in the encrypted payload 210 (e.g., in the unique ID field 226) such that only the testing/originating PE is aware of it.

Upon generating the test frame 200, it is provided to the customer network where a receiving node will broadcast the test frame on all its ports (other than the port on which the test frame is received) since the SA/DA MAC information is not provisioned in its filtering/forwarding databases. All remaining CE nodes will also accordingly broadcast the test frame or its duplicates within the network. If a data loop exists in the customer network, it is possible that another PE entity that interfaces across the provider-customer bridge domain will ultimately receive the test frame or its duplicate(s). Since the test frame has the format of a regular data frame, the receiving PE entity/node will tunnel it across the provider network, in one or multiple hops, until the test frame is eventually transmitted back to the originating PE node. Accordingly, if the test frame or its duplicate(s) is received back by the originating PE node, it can deduce the existence and location of a loop across the provider/customer network by examining the SA/DA MAC information as well as the encoded unique ID information of the received test frame or its duplicate.

Figure 3:
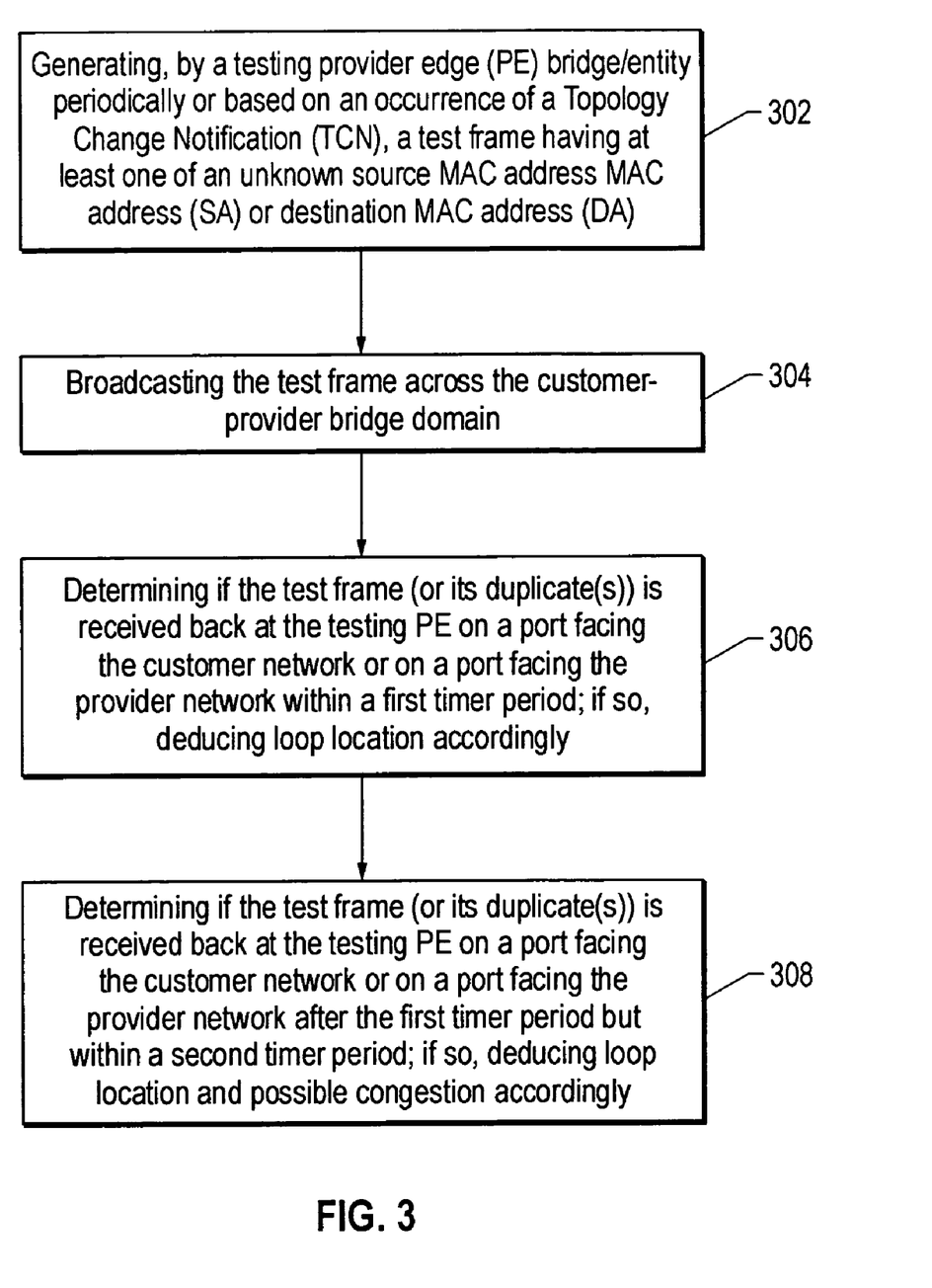
FIG. 3 is a flow chart of a loop detection method operable in an Ethernet network according to one embodiment of the invention.
Figure 4:
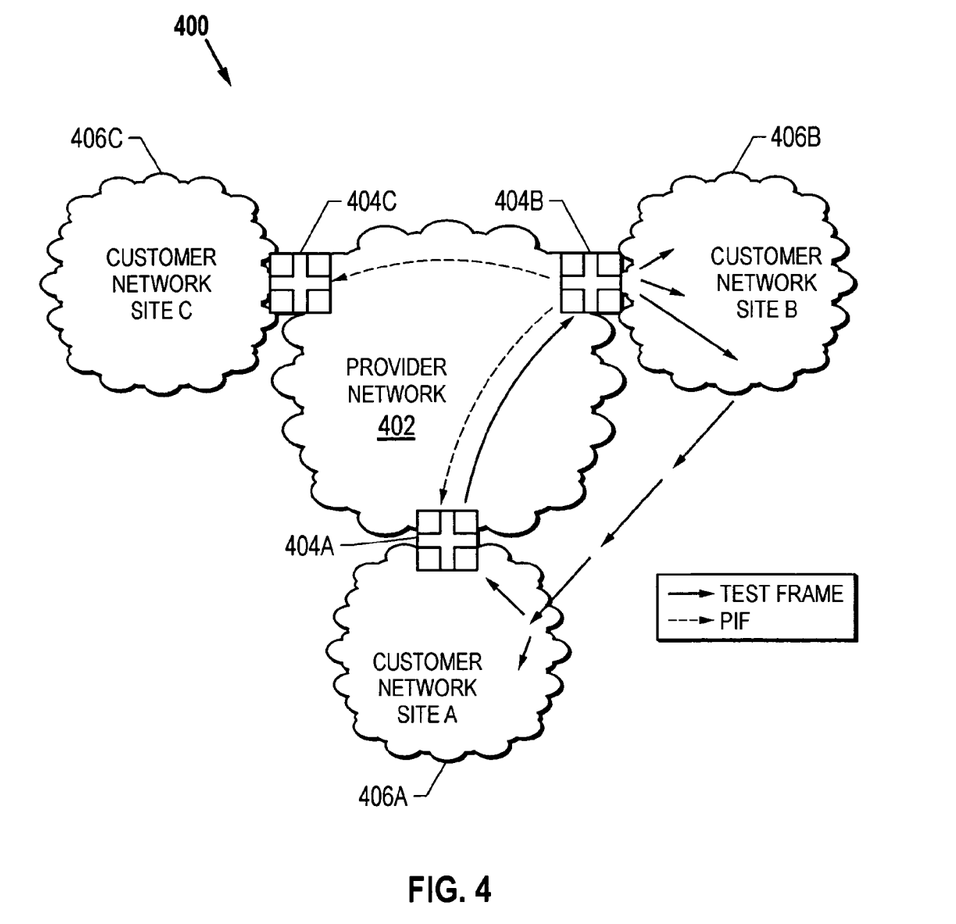
FIG. 4 depicts an exemplary provider-customer network configuration where loops may be detected according to another embodiment of the invention.

FIG. 3 is a flow chart of a loop detection method operable in an Ethernet network according to the scheme set forth above. At block 302, a testing PE entity of a provider network generates a test frame (i.e., a loop detection frame) having at least one of a source MAC address (SA) or a destination MAC address (DA) that is (are) unknown to a target customer network. The loop detection frames may be transmitted periodically (e.g., every hour) or based on an occurrence of a Topology Change Notification (TCN) issued within the network. As provided in the foregoing discussion, the unknown SA and/or DA MAC addresses of a test frame may be generated in a number of ways, wherein the test frame may also include other encrypted information in its payload. The test frame is thereafter broadcast across the customer-provider bridge domain into the customer network, wherein it is forwarded to all entities (block 304). If the test frame (or its duplicate) is received back within a first timer period (e.g., on the order of a few minutes) at the testing PE entity on a port facing the customer network, then the loop detection logic of the testing PE entity is operable to deduce that there exists a data loop of Loop 2 or Loop 3 type illustrated in FIG. 1. On the other hand, if the testing PE entity receives back the test frame within the first timer period on a port facing the provider network (implicating traversal of the test frame within the provider network), the loop detection logic of the testing PE is operable to deduce that a data loop of Loop 1 type is present within the network. These processes are consolidated at block 306. As a further variation, a second timer (on the order of an hour or so) may also be implemented in the loop detection scheme in conjunction with the first timer period, wherein it is determined if the test frame or its duplicate is received back at the testing PE entity within the window defined by the first and second timer periods. If so, the loop detection logic is operable to deduce the location of a loop accordingly, including an indication of possible network congestion (block 308). It will be apparent to those skilled in the art upon reference hereto that the various loop detection operations and associated logic may be embodied by way of software, firmware, or hardware, or in combination thereof. Further, such logic structure and functionality may be partitioned, modularized or integrated in a number of ways as part of the PE bridge logic.

Where multiple customer locations are provisioned as part of a single customer network, a further variation is provided in order to identify the location of the customer network portion from which a test frame is returned, thereby signifying the location of a data loop path therein. FIG. 4 depicts an exemplary provider-customer network configuration 400 having multiple customer sites where loops may be detected according to another embodiment. A provider network 402 is exemplified with three PE entities 404A-404C, each interfacing with a corresponding customer VLAN site. As illustrated, PE entity 404A is interfaced with C-VLAN site A 406A, PE entity 404B is interfaced with C-VLAN site B 406B, and PE entity 404C is interfaced with C-VLAN site C 406C. Essentially, in this embodiment, the loop detection logic associated with a testing PE entity is provided with the capability to ascertain the last PE entity traversed by a loop detection frame before it is received back. In order to facilitate such a process, the PE entities of the provider network are endowed with test-awareness, i.e., each PE entity is provided with logic to discriminate a test frame or its duplicate(s) that are propagated during loop detection from regular data frame traffic. A provider information frame (PIF), described in additional detail below, is generated and forwarded by a testing entity, e.g., by way of illustration, PE entity 404B, prior to the transmission of the testing frames. Upon broadcasting of the test frames into the customer network at one location, if a test-aware PE entity interfaced with another customer network location, such as PE entity 404A, receives a test frame or its duplicate (because of a "backdoor" data loop in the network), the logic thereat is operable to insert the receiving PE entity's identity e.g., its MAC address or R/STP ID, into the test frame and unicast it to the testing PE entity 404B. Thereafter, the loop detection logic of the testing entity may proceed with deducing the location and nature of the data loop in the network.

Figure 5:
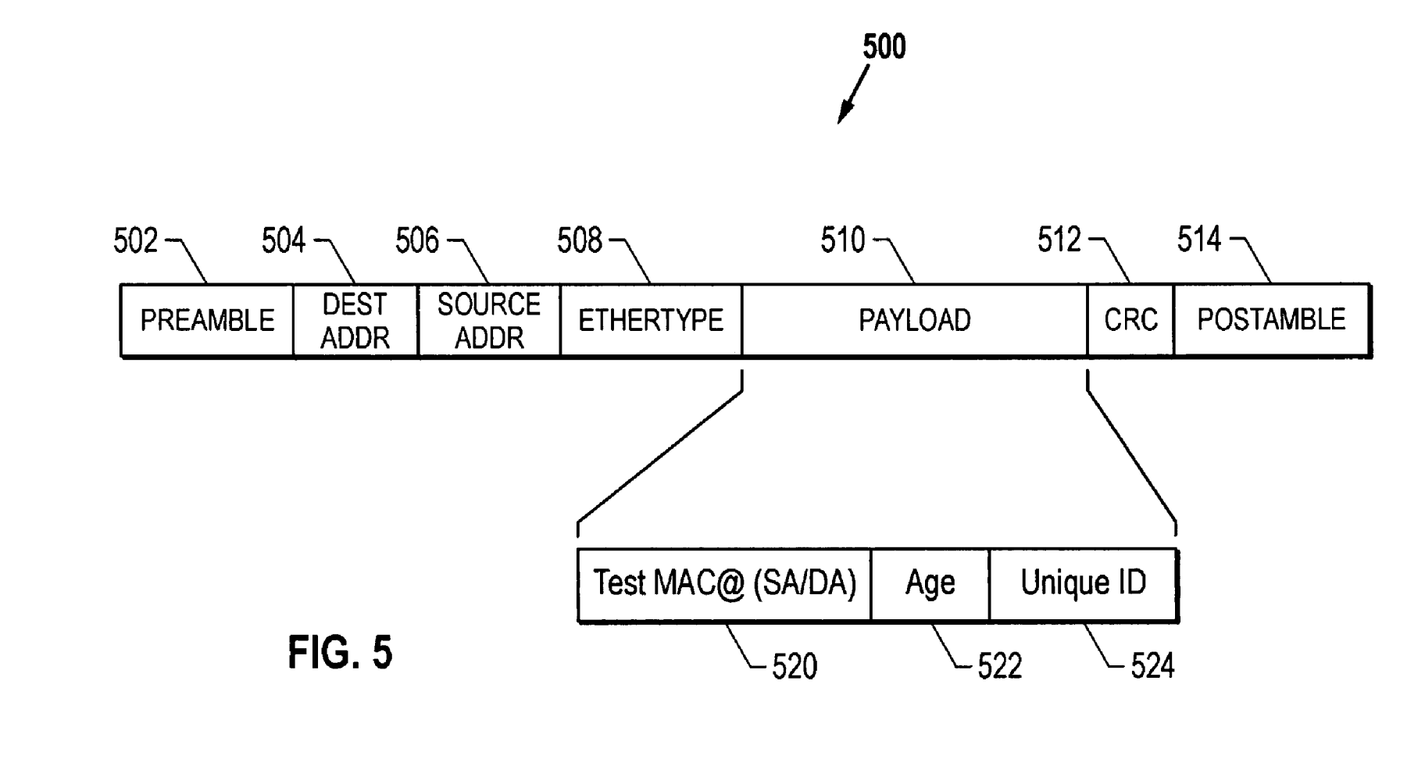
FIG. 5 depicts an embodiment of a provider information frame operable with the network configuration shown in FIG. 4.

FIG. 5 depicts an embodiment of a provider information frame 500 operable with the embodiment shown in FIG. 4. Similar to the test frame format described above, the provider information frame 500 includes preamble and postamble fields 502 and 514, DA and SA fields 504 and 506, EtherType field 508 (e.g., IP), and a CRC field 512. A payload field 520 contains a plurality of sub-fields with the following information: a sub-field 520 containing the SA/DA MAC addresses of the test frame; a sub-field 522 containing an additional age limit provided to the test-aware provider bridges; and a sub-field 524 with a unique ID in order to detect duplicate frames. As alluded to before, the SA/DA MAC addresses of the test frame may be randomly generated by the testing PE entity or selected from a reserved pool of addresses having a temporary life span. In one implementation, a hashing technique may be used for generating random MAC addresses. For instance, a number between 1 and 10 may be generated with respect to each bit of a MAC address field, wherein a particular bit may be flipped if the number is $\leq 5$ (i.e., if the bit is originally 0 then flip it to 1 and vice versa).

As part of provisioning, databases associated with the provider bridges of an Network environment are therefore populated with the applicable test frame information set forth above. Accordingly, the provider bridges in the network will be able to ascertain the identity of the test frame used to perform the loop detection test. On the other hand, bridges that do not have the SA/DA MAC addresses of the test frames will drop them.

The provider information frame 500 is operable to be multicast to all provider bridges in the network before a test frame is broadcast across a provider-customer bridge domain. When a provider bridge detects the test frame on its return path, it inserts its ID in the DF1 sub-field of the test frame that is unicast to the testing PE for purposes of loop detection.

Figure 6:
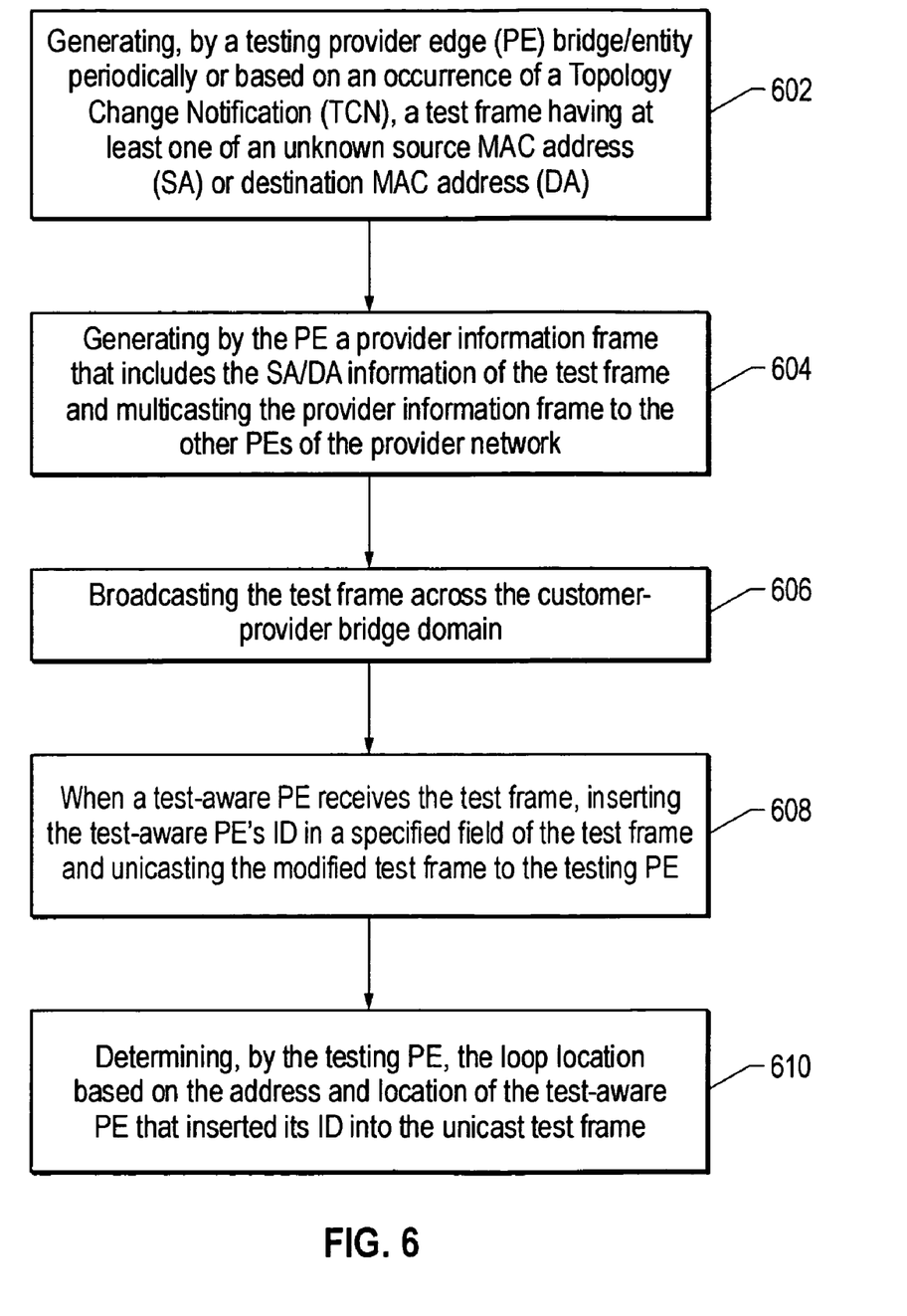
FIG. 6 is a flow chart of a loop detection method operable in an Ethernet network according to another embodiment of the invention.

The various operations illustrated above are generalized as a flow chart in FIG. 6 which depicts a loop detection embodiment operable in an Ethernet network such as the provider-customer network environment 400 described previously with respect to FIG. 4. As before, a testing PE entity is operable to generate a test frame, either periodically or based on an occurrence of a TCN, which includes at least one of a DA or SA MAC address that is (are) unknown to a target customer network comprising one or more sites (block 602). A provider information frame including the DA/SA information of the test frame is generated by the testing PE entity's logic, which is multicast to all provider bridges of the provider network (block 604). Thereafter, the test frame is broadcast into the customer network across the customer-provider bridge domain for detecting the location and nature of data loops therein (block 606). When a test-aware PE entity receives the test frame or its duplicate(s), it inserts its own ID in a specified field of the test frame and unicasts the modified test frame to the testing PE entity (block 608). Upon receiving the modified test frame (or its duplicate), the testing PE entity determines the loop location based on the ID/address and location of the test-aware PE that modified the test frame (block 610). By way of one implementation, when the test frame's SA or DA address ages out in bridges other than the testing bridge, the test MAC address may be flushed out. Once again it will be apparent to those skilled in the art upon reference hereto that these operations and associated logic may be embodied in software, firmware, or hardware, or in combination thereof and such logic structure and functionality may be partitioned, modularized or integrated in a number of ways as part of a provider bridge's loop detection logic.

Based on the foregoing Detailed Description, it should be appreciated that the present invention advantageously provides a loop detection mechanism operable in an Ethernet environment wherein a provider is capable of detecting possible loops in a customer VLAN in an unobtrusive manner. The customer network may then be informed appropriately so as to eliminate efficiency-reducing loops via reconfiguration.

Although the invention has been described with reference to certain exemplary embodiments, it is to be understood that the forms of the invention shown and described are to be treated as exemplary embodiments only. Accordingly, various changes, substitutions and modifications can be realized without departing from the spirit and scope of the invention as defined by the appended claims.

What is claimed is:

1. A loop detection method operable in an Ethernet network, comprising:
   generating, by a provider edge (PE) entity disposed in a provider network, a test frame with at least one of a source address (SA) and destination address (DA) unknown to a customer network;
   broadcasting said test frame to said customer network coupled to said PE entity;
   determining if said test frame is received back by said PE entity after expiration of a first time period but within a second time period, and if so, deducing loop location within said network with an indication of congestion responsive to said determination; and
   determining whether at least one of said test frame and a duplicate of said test frame is received back on a port of said PE entity facing said provider network within which said PE entity is disposed, and if so, deducing that a loop is located that traverses said customer network and said provider network, wherein said determining includes determining whether at least one of said test frame and the duplicate of said test frame is received back on a port after expiration of a first time period but within a second time period.

2. The loop detection method operable in an Ethernet network as recited in claim 1, further comprising determining whether at least one of said test frame and the duplicate of said test frame ate is received back on a port of said PE entity facing said customer network after expiration of a first time period but within a second time period, and if so, deducing that a loop is located within said customer network.

3. The loop detection method operable in an Ethernet network as recited in claim 2, wherein said loop touches a provider bridge entity disposed on a edge between said provider network and said customer network.

4. The loop detection method operable in an Ethernet network as recited in claim 1, wherein said test frame comprises a payload portion that includes at least one of a timestamp field, a unique identifier (ID) field, an age field indicative of a time limit on at least one of said SA and said DA of said test frame, and an address field that is indicative of a Media Access Control (MAC) address of a bridge entity last traversed by said test frame.

5. The loop detection method operable in an Ethernet network as recited in claim 4, wherein said unique ID field contains random data known only to said PE entity.

6. The loop detection method operable in an Ethernet network as recited in claim 1, wherein said SA contains a temporary MAC address that is randomly generated by said PE entity.

7. The loop detection method operable in an Ethernet network as recited in claim 1, wherein said DA contains a temporary MAC address that is randomly generated by said PE entity.

8. The loop detection method operable in an Ethernet network as recited in claim 1, further comprising:
   prior to broadcasting said test frame to said customer domain network, multicasting a provider information frame to other provider bridge entities of said provider network, wherein said provider information frame includes said test frame's SA and DA;
   when a provider bridge of said provider network receives at least one of said test frame and a duplicate of said test frame, inserting said provider bridge's identity (ID) in a particular portion of said test frame or the duplicate of said test frame; and
   forwarding said test frame or the duplicate of said test frame to said PE entity.

9. The loop detection method operable in an Ethernet network as recited in claim 8, wherein at least one of said test frame's SA and DA is generated randomly.

10. The loop detection method operable in an Ethernet network as recited in claim 8, wherein at least one of said test frame's SA and DA is generated from a predetermined range of Media Access Control (MAC) addresses.

11. The loop detection method operable in an Ethernet network as recited in claim 8, wherein said test frame includes an age field indicative of a time limit on at least one of said SA and DA addresses of said test frame.

12. The loop detection method operable in an Ethernet network as recited in claim 1, wherein said test frame is generated periodically.

13. The loop detection method operable in an Ethernet network as recited in claim 1, wherein said test frame is generated upon receiving a Topology Change Notification (TCN).

14. A loop detection system operable in an Ethernet network, comprising:
   means for generating, by a provider edge (PE) entity disposed in a provider network, a test frame with at least one of a source address (SA) and destination address (DA) unknown to a customer network;
   means for broadcasting said test frame to said customer network coupled to said PE entity;
   means for deducing loop location within said network with an indication of congestion responsive to determining if said test frame is received back by said PE entity after expiration of a first time period but within a second time period; and
   means for determining whether at least one of said test frame and a duplicate of said test frame is received back on a port of said PE entity facing said provider network within which said PE entity is disposed, and if so, deducing that a loop is located that traverses said customer network and said provider network, wherein said determining includes determining whether at least one of said test frame and the duplicate of said test frame is received back on a port after expiration of a first time period but within a second time period.

15. The loop detection system operable in an Ethernet network as recited in claim 14, further comprising means for determining whether at least one of said test frame and the duplicate of said test frame is received back on a port of said PE entity facing said customer network after expiration of a first time period but within a second time period, and if so, deducing that a loop is located within said customer network.

16. The loop detection system operable in an Ethernet network as recited in claim 15, wherein said loop touches a provider bridge entity disposed on a edge between said provider network and said customer network.

17. The loop detection system operable in an Ethernet network as recited in claim 14, wherein said test frame comprises a payload portion that includes at least one of a timestamp field, a unique identifier (ID) field, an age field indicative of a time limit on at least one of said SA and said DA of said test frame, and an address field that is indicative of a Media Access Control (MAC) address of a bridge entity last traversed by said test frame.

18. The loop detection system operable in an Ethernet network as recited in claim 17, wherein said unique ID field contains random data known only to said PE entity.

19. The loop detection system operable in an Ethernet network as recited in claim 14, wherein said SA contains a temporary MAC address that is randomly generated by said PE entity.

20. The loop detection system operable in an Ethernet network as recited in claim 14, wherein said DA contains a temporary MAC address that is randomly generated by said PE entity.

21. The loop detection system operable in an Ethernet network as recited in claim 14, further comprising:
   means for multicasting a provider information frame to other provider bridge entities of said provider network, said means for multicasting operating prior to broadcasting said test frame to said customer domain network, wherein said provider information frame includes said test frame's SA and DA;
   means for inserting a provider bridge's identity (ID) in a particular portion of said test frame or a duplicate of said test frame when said provider bridge of said provider network receives at least one of said test frame and the duplicate of said test frame; and
   means for forwarding said test frame or the duplicate of said test frame to said PE entity.

22. The loop detection system operable in an Ethernet network as recited in claim 21, wherein at least one of said test frame's SA and DA is generated randomly.

23. The loop detection system operable in an Ethernet network as recited in claim 21, wherein at least one of said test frame's SA and DA is generated from a predetermined range of Media Access Control (MAC) addresses.

24. The loop detection system operable in an Ethernet network as recited in claim 21, wherein said test frame includes an age field indicative of a time limit on at least one of said SA and DA addresses of said test frame.

25. The loop detection system operable in an Ethernet network as recited in claim 21, wherein said customer network is comprised of multiple sites, each site having a customer network portion that is interfaced to said provider network via a corresponding PE entity.

26. The loop detection system operable in an Ethernet network as recited in claim 14, wherein said test frame is generated periodically.

27. The loop detection system operable in an Ethernet network as recited in claim 14, wherein said test frame is generated upon receiving a Topology Change Notification (TCN).

* * * * *